United States Patent Office 3,475,420
Patented Oct. 28, 1969

3,475,420
17β - HYDROXY - 3 - OXOESTR - 4 - EN - 17α-YLMETHYLMALONIC ACID γ-LACTONE AND PRECURSORS
Edward A. Brown, Wilmette, Ill., assignor to G. D. Searle & Co., Chicago, Ill., a corporation of Delaware
No Drawing. Filed Aug. 20, 1968, Ser. No. 753,904
Int. Cl. C07c 173/00; A61k 27/00
U.S. Cl. 260—239.57                    4 Claims

ABSTRACT OF THE DISCLOSURE

Preparation of the captioned compounds and their valuable biological properties—including pepsin-inhibiting, anti-estrogenic, and progestational activities—are disclosed.

---

This invention relates to 17β-hydroxy-3-oxoestr-4-en-17α-ylmethylmalonic acid γ-lactone and precursors, and to processes for the preparation thereof. More particularly, this invention provides new, useful, and unobvious chemical compounds of the formulas

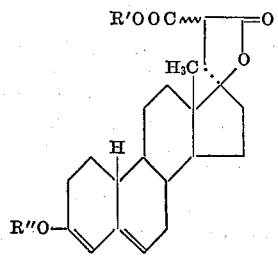

and

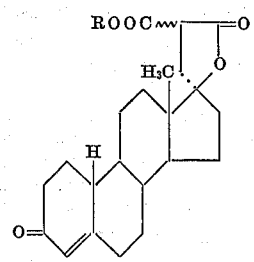

wherein R' and R" each represent alkyl, alike or different, and R represents hydrogen or alkyl. Among the alkyls represented by R', R", and R, lower alkyls are preferred, which is to say methyl, ethyl, propyl, isopropyl, butyl, isobutyl, sec.-butyl, tert.-butyl, pentyl, neopentyl, hexyl, isohexyl, heptyl, and like saturated, monovalent, acyclic, straight- or branched-chain, hydrocarbon groupings of empirical formula $$-C_nH_{2n+1}$$

wherein $n$ represents a positive integer less than 8.

The compounds to which this invention relates are useful by reason of their valuable biological properties. Thus, for example, they are pepsin-inhibiting, anti-estrogenic, and progestational.

The pepsin-inhibiting utility of the compounds of this invention is evident from the results of a standardized test for their effect on the proteolysis of hemoglobin by pepsin. The technique employed is a modification of that described by M. L. Anson in J. Gen. Physiol., 22, 791 (1938), and depends upon the fact that the aforesaid proteolysis results in liberation of peptides containing tyrosine and tryptophan units characterized by an absorption band in the ultraviolet spectrum at 275 mμ. Absorption at this wavelength serves therefore as an index of the extent to which the proteolysis has occurred. Each test is carried out in 4 test tubes to which are added solutions, measured in ml., of hemoglobin, pepsin, compound, hydrochloric acid, and perchloric acid. The additions are made immediately before and immediately after simultaneous incubation at 37° C. in accordance with the schedule shown in Table I.

TABLE I

| Test Tube Number | Addns. at 0 Time | | | | Addns. after 2 Hr. at 37° | | |
|---|---|---|---|---|---|---|---|
| | HGB | PEP | CPD | HCL | CPD | HCL | HCLO₄ |
| 1 | 5 | 1 | | 1 | 1 | | 1 |
| 2 | 5 | 1 | | 1 | 1 | | 1 |
| 3 | 5 | 1 | 1 | | | 1 | 1 |
| 4 | 5 | 1 | 1 | | | 1 | 1 |

The hemoglobin solution (HGB) is prepared by mixing 60 gm. of Hemoglobin Substrate Powder (bovine) [Worthington Biochemical Corporation, Freehold, N.J.] with 2000 ml. of double distilled water, successively filtering and centrifuging the resultant slurry, adjusting the pH of the saturated solution thus separated to 2.0 with 6 N hydrochloric acid, and finally diluting with an equal volume of pH 2.0 hydrochloric acid, prepared as described below. The pepsin solution (PEP) is prepared by dissolving 4.0 mg. of 3X Crystallized Pepsin (hog) [Pentex, Incorporated, Kankakee, Ill.] in 200 ml. of pH 2.0 hydrochloric acid and diluting 6.25 ml. of the resultant solution with a further quantity of pH 2.0 hydrochloric acid q.s. 25 ml. The compound solution (CPD) is prepared by mixing 5 mg. of compound with 5.0 ml. of pH 2.0 hydrochloric acid and filtering out any material which remains insoluble. The hydrochloric acid solution (HCL) is prepared by diluting concentrated hydrochloric acid to pH 2.0 with double distilled water. The perchloric acid is prepared by diluting concentrated perchloric acid with double distilled water q.s. 20% by volume.

When the additions after incubation have been completed, the contents of each tube is filtered to remove undigested protein precipitated by the perchloric acid (which also serves to inactivate the enzyme), 1 ml. of each filtrate is diluted with 10 ml. of pH 5 sodium acetate buffer, and the resultant solutions are subjected to UV spectrophotometric analyses whereby the absorptions at 275 mμ are determined. Among the 4 values thus obtained for each compound tested, those deriving from Tube Nos. 1 and 2 serve as controls, being representative of absorption due to peptides produced by incubation of uninhibited enzyme and substrate superimposed upon absorption due to compound itself, whereas those deriving from Tube Nos. 3 and 4—so-called "treats"—represent absorption due to peptides produced by incubation of enzyme and substrate in the presence of compound, superimposed upon absorption due to compound itself. A compound is considered pepsin-inhibiting if the mean treat value (treat) is significantly ($P \leq 0.05$, student's t-test) less than the mean control value (control) therefor. Pepsin is known to play a causal role in the production of peptic ulcer.

The anti-estrogenic utility of the instant compounds is evident from the results of a standardized test for their capacity to antagonize the stimulatory effect of estrone on uterine growth in immature mice. Procedure is substantially the same as that described by Edgren et al. in Proc. Soc. Exp. Biol. Med., 94, 537 (1957). White, female, 21-day old mice maintained on a synthetic, estrogen-free diet are used as test animals. To each of a group of 6–10 such animals, 0.1 mcgm. of estrone dissolved in 0.1 ml. of corn oil is administered subcutaneously and test compound dissolved or suspended in corn oil is administered subcutaneously or buccally, on each of 3 successive days. Commonly, the initial total dose of compound is 1 mg. in 0.1 ml. of corn oil administered subcutaneously in 3 equal portions. A second group of 6–10 animals identically and concurrently treated except that no test compound is administered serves as controls. The day after treatment is concluded, the animals are sacrificed; and the uteri are excised, dissected free of extraneous tissue, blotted to express contained fluid, and individually weighed. A compound is considered active if the mean uterine weight of the animals treated therewith is significantly ($P \leq 0.01$) less than the mean uterine weight of the controls. Potency of an active compound, relative to progesterone, is determined by repeating the test at progressively diminishing doses sufficient to fit a log dose response curve by the method of least squares to a corresponding curve for progesterone developed by substituting 200, 100, and 50 mcgm. of progesterone, administered subcutaneously, for test compound in the foregoing procedure. From these curves, a dose of compound and a dose of progesterone which produce an identical decrease in mean uterine weight are selected, the second value is divided by the first, and the quotient is multiplied by 100 to give the percent potency.

The progestational utility of the instant compounds is evident from the results of a standardized test for their capacity to induce arborization of the endometrial glands in immature, estrogen-primed rabbits. The procedure is a modification of that described by Clauberg in C. Zentr. Gynakol, 54, 2757 (1930). Immature female rabbits weighing about 1 kg. and primed with 17β-estradiol by subcutaneously injecting 5 mcgm. thereof per animal on each of 6 successive days are used in this test. To each of a group of 3–4 such animals, beginning the next day after the last priming injection, test compound dissolved or suspended in corn oil is administered subcutaneously or buccally on each of 5 successive days. Commonly, the initial daily dosage is 1 mg. of compound in 0.1 ml. of corn oil administered subcutaneously. Other animals likewise administered corn oil alone serve as controls. On the 6th day after the last priming injection, the animals are sacrificed; and a segment of each uterus is taken for histological examination whereby the degree of arborization of the endometrial glands is graded in accordance with a method similar to that described by McPhail in J. Physiol., 83, 145 (1934). A +1 response represents the effect of estrogen priming alone and is indicated by the absence of glandular proliferation. A +2 response is defined as that induced in the estrogen-primed animal by 0.05 mg. of progesterone administered subcutaneously, and is considered to represent minimal progestational activity. Responses in the range +3 to +4 reflect potent progestational effects typical of those produced by 0.1 mg. of subcutaneaous progesterone. If the average reading for the test animals is less than +2 at the 1 mg. dose level, the compound is considered inactive. If the average rating at this dose is greater than +2, the test is repeated with compound administered in progressively lesser amounts until the dose required to produce an average rating of precisely +2 can be determined. Potency of the compound, relative to progesterone, is then calculated by dividing this dose into 0.05 and multiplying by 100.

Those skilled in the art will recognize that observations of activity in standardized tests for particular biological effects are fundamental to the development of valuable new drugs, both veterinary and human.

Preparation of the enol ethers of this invention [first formula column 1] proceeds by contacting an enol ether of the formula

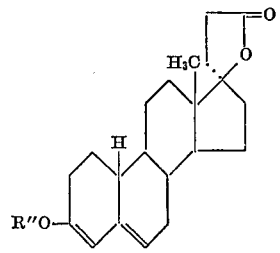

U.S. 3,194,803 with a dialkyl carbonate of the formula $(R'O)_2CO$ in the presence of sodium hydride, R' and R" in the latter two formulas having the meanings previously assigned. From the resultant enol ether, the corresponding 4-en-3-one is obtained by heating with ethanolic hydrochloric acid; and the resultant ester is saponified by heating with aqueous methanolic potassium hydroxide.

The following examples describe in detail compounds illustrative of the present invention and methods which have been devised for the preparation thereof. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

Methyl 3-ethoxy-17β-hydroxyestra-3,5-dien-17α-yl-methylmalonate γ-lacetone

To 83 parts of a mineral oil 59% sodium hydride dispersion suspended in 600 parts of dimethyl carbonate is added, with stirring, a solution of 165 parts of 3-(3-ethoxy-17β-hydroxyestra-3,5-dien - 17α - yl)propionic acid γ-lactone in 1750 parts of dimethyl carbonate. The resultant mixture is held at room temperatures with intermittent stirring for 6 days, whereupon insoluble solids are filtered off, washed free of dimethyl carbonate with hexane, triturated with 3000 parts of 25° water, dried in air, and recrystallized from aqueous acetone to give methyl 3-ethoxy-17β-hydroxyestra-3,5-dien-17α - ylmethylmalonate γ-lactone, having the formula

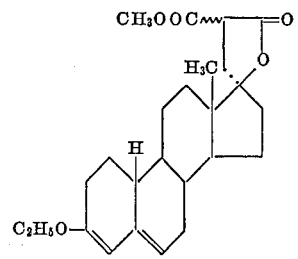

EXAMPLE 2

Methyl 17β-hydroxy-3-oxoestr-4-en-17α-ylmethyl-malonate γ-lactone

A suspension of 14 parts of methyl 3-ethoxy-17β-hydroxyestra-3,5-dien-17α-ylmethylmalonate γ-lactone in 120 parts of ethanol, 6 parts of water, and approximately 4 parts of concentrated hydrochloric acid is heated to the boiling point and then filtered hot. The filtrate is allowed to stand at room temperatures for 1 hour, whereupon it is poured into 600 parts of cold water. The precipitate thrown down is filtered off, washed with water, and dried in air to give methyl 17β-hydroxy-3-oxoestr-4-en-17α-ylmethylmalonate γ-lactone, having the formula

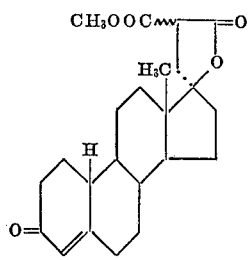

EXAMPLE 3

17β-hydroxy-3-oxoestr-4-en-17α-ylmethylmalonic acid γ-lactone

To a solution of 10 parts of methyl 17β-hydroxy-3-oxoestr-4-en-17α-ylmethylmalonate γlactone in 80 parts of methanol is added, with stirring, a solution of 3 parts of 85% potassium hydroxide in 6 parts of water. The resultant solution is heated at the boiling point under reflux for 20 minutes, whereupon solvent is removed by vacuum distillation. Sufficient benzene is vacuum distilled from the residue to remove residual moisture, whereupon the residue is mixed with 60 parts of ethanol. Sufficient 15% hydrochloric acid is added to render the mixture acid to litmus. Solution, followed by precipitation occurs. After 1 hour at ambient temperatures, the mixture is filtered; and the filtrate is diluted with 500 parts of water. The precipitate thrown down is filtered off, washed with water, and dried in air to give 17-hydroxy-3-oxoestr-4-en-17α-ylmethylmalonic acid γ-lactone melting in the range 140–150° with gas evolution. The product has the formula

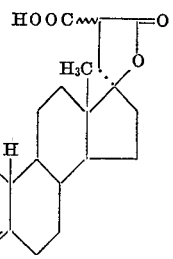

What is claimed is:

1. A compound selected from the group consisting of methyl 3-ethoxy-17β-hydroxyestra-3,5-dien-17α-ylmethylmalonate γ-lactone and compounds of the formula

ROOC— =O
H₃C
H
O= wherein R represents hydrogen or lower alkyl.

2. A compound according to claim 1 which is methyl 3 - ethoxy - 17β - hydroxyestra - 3,5-dien - 17α - ylmethylmalonate γ-lactone.

3. A compound according to claim 1 which is methyl 17β - hydroxy - 3 - oxoestr - 4 - en - 17α - ylmethylmalonate γ-lactone.

4. A compound according to claim 1 which is 17β-hydroxy-3-oxoestr-4-en-17α-ylmethylmalonic acid γ-lactone.

References Cited

UNITED STATES PATENTS 3,300,489  1/1967  Holden _____ 260—239.57

LEWIS GOTTS, Primary Examiner

ETHEL G. LOVE, Assistant Examiner

U.S. Cl. X.R.

424—241